US008003741B2

(12) United States Patent
Vizzini et al.

(10) Patent No.: US 8,003,741 B2
(45) Date of Patent: Aug. 23, 2011

(54) ZIEGLER-NATTA CATALYST

(75) Inventors: Kayo Vizzini, Pasadena, TX (US); David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 442 days.

(21) Appl. No.: 12/069,190

(22) Filed: Feb. 7, 2008

(65) Prior Publication Data

US 2009/0203856 A1    Aug. 13, 2009

(51) Int. Cl.
  *C08F 4/50* (2006.01)
(52) U.S. Cl. .................................... 526/124.3
(58) Field of Classification Search ................ 526/124.3
  See application file for complete search history.

(56) References Cited

U.S. PATENT DOCUMENTS

| 6,486,274 | B1 | 11/2002 | Gray et al. |
| 6,930,071 | B2 | 8/2005 | Knoeppel et al. |
| 2003/0018143 | A1 | 1/2003 | Gray et al. |
| 2005/0085601 | A1 | 4/2005 | Vizzini et al. |
| 2005/0209094 | A1 | 9/2005 | Knoeppel et al. |
| 2007/0299224 | A1 | 12/2007 | Vizzini |

*Primary Examiner* — David Wu
*Assistant Examiner* — Sonya Wright

(57) ABSTRACT

The present invention relates generally to catalysts, to methods of making catalysts, to methods of using catalysts, to methods of polymerizing, and to polymers made with such catalysts. More particularly, the present invention relates to polyolefin catalysts and to Ziegler-Natta catalysts, to methods of making such catalysts, to methods of using such catalysts, to polyolefin polymerization, and to polyolefins.

22 Claims, No Drawings

ZIEGLER-NATTA CATALYST

FIELD

The present invention relates generally to catalysts, to methods of making catalysts, to methods of using the catalysts in polymerization, and to the resulting polymers. More particularly, the present invention relates to Ziegler-Natta catalysts, and to improved methods of making such catalysts.

BACKGROUND

A Ziegler-Natta type polymerization catalyst component can be a complex derived from a halide of a transition metal, for example, titanium, chromium or vanadium, with a metal hydride and/or a metal alkyl that is typically an organoaluminum compound. The catalyst component is usually comprised of a titanium halide supported on a magnesium compound complexed with an alkylaluminum. Usual methods for synthesizing Ziegler-Natta catalyst systems require six or more steps, and the use of expensive specialty chemicals such as blends. Examples of catalyst systems, their methods of preparation and use are provided in U.S. Pat. Nos. 4,107,413; 4,294,721; 4,439,540; 4,114,319; 4,220,554; 4,460,701; 4,562,173; 5,066,738; 6,693,058; 6,174,971; 6,734,134; 6,846,887; 6,864,207; 6,916,895, 6,930,071; and 6,486,274; as well as in U.S. Pat. App. Nos. 2005/0209094; 2003/0018143; 2004/0058803; and 2004/0058802. Any improvement in the production of these catalysts that decrease their cost while maintaining or improving performance would be extremely valuable.

SUMMARY

In one embodiment, the invention relates to a process for forming a catalyst comprising: contacting an alkyl magnesium compound with alcohol to form a magnesium dialkoxide compound; contacting the magnesium dialkoxide compound with a plurality of first agents to thereby form a solid reaction product "A", wherein the plurality of first agents comprises a first compound, a second compound, and a third compound; wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic; x is 0 or 1; and y+z is the valence of A; wherein the first and second compounds are contacted with the magnesium dialkoxide in the substantial absence of metal halide; and wherein the third compound is contacted last and consists essentially of unblended TiCl$_4$. The reaction product "A" can then be contacted with a second agent to form reaction product "B", wherein the second agent comprises a metal halide; and then reaction product "B" is contacted with a third agent to form a catalyst, wherein the third agent comprises an organoaluminum compound.

Another embodiment involves a method for forming a polyolefin, polyethylene for example, comprising: providing a magnesium dialkoxide compound; contacting the magnesium dialkoxide compound with a plurality of unblended first agents to thereby form a solid reaction product, wherein the plurality of first agents comprises a first compound, a second compound, and a third compound; wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic; x is 0 or 1; and y+z is the valence of A; wherein the first and second compounds are contacted with the magnesium dialkoxide in the substantial absence of metal halide; and wherein the third compound is contacted last and comprises TiCl$_4$; to thereby form a solid reaction product. The solid reaction product may then be contacted with agents selected from halogenating agents/titanating agents, activating agents and combinations thereof to form a catalyst; and then the catalyst is contacted with olefin monomer(s) to form polyolefin.

In a third embodiment a catalyst precursor is formed by a process consisting essentially of: contacting, in a single reagent or mixture of reagents, a magnesium dialkoxide compound with a plurality of unblended compounds to thereby precipitate a solid catalyst precursor, wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic; x is 0 or 1; and y+z is the valence of A; wherein the first and second compounds are contacted with the magnesium dialkoxide in the substantial absence of metal halide, such as TiCl$_4$ (neat or dissolved); and wherein the third compound is contacted last and is TiCl$_4$.

Another embodiment provides a process of forming a catalyst comprising: contacting an alkyl magnesium compound with alcohol to form a magnesium dialkoxide compound; contacting the magnesium dialkoxide compound with a plurality of first agents to thereby form a solid reaction product "A", wherein the plurality of first agents consists essentially of a first compound, a second compound, and a third compound wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic; x is 0 or 1; and y+z is the valence of A; wherein the third compound is contacted last and is TiCl$_4$; contacting reaction product "A" with a second agent to form reaction product "B", wherein the second agent comprises a metal halide; and contacting reaction product "B" with a third agent to form a catalyst, wherein the third agent comprises an organoaluminum compound.

Another embodiment provides a process for forming a catalyst comprising: contacting an alkyl magnesium compound with alcohol to form a magnesium dialkoxide compound; contacting the magnesium dialkoxide compound with a plurality of first agents to thereby form a solid reaction product "A", wherein the plurality of first agents consists essentially of a first compound and a second compound; wherein the first compound is represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic; x is 0 or 1; and y+z is the valence of A; wherein the first compound is contacted with the magnesium dialkoxide in the substantial absence of metal halide; and wherein the second compound is contacted last and comprises $TiCl_4$; contacting reaction product "A" with a second agent to form reaction product "B", wherein the second agent comprises a metal halide; and contacting reaction product "B" with a third agent to form a catalyst, wherein the third agent comprises an organoaluminum compound.

In any of the embodiments described herein, the alkyl magnesium compound may be represented by the formula $MgR^1R^2$, wherein $R^1$ and $R^2$ are independently selected from $C_1$ to $C_{10}$ alkyls. Included are embodiments wherein the alkyl magnesium compound is selected from butyl ethyl magnesium, diethyl magnesium, dipropyl magnesium, dibutyl magnesium and combinations thereof.

In any of the embodiments described herein, the alcohol may contact the alkyl magnesium compound in an equivalent of from about 0.5 to about 6, and the alcohol may be represented by the formula $R^3OH$, wherein $R^3$ is selected from $C_2$ to $C_{20}$ alkyls.

In any of these processes, the reaction product B may be further contacted with metal halide or, in a further embodiment may be contact with organoaluminum compound without further metal halide contact. This can result in substantial cost reduction.

In any of the embodiments described herein, R may be independently selected from $C_2$-$C_8$, or specifically a $C_3$ or $C_4$ alkyl, for both the first and second compounds, and A may be titanium for both the first and second compounds. And the first and second compounds may be blended before being contacted with the magnesium dialkoxide, but advantageously they can be contacted separately. The first compound may comprise tetra n-butyl-titanate, and the second compound may comprise titanium isopropoxide or vice versa.

In any of the embodiments described herein, the plurality of firsts agents may consist essentially of the first, second and third compounds. They may generally be added to the dialkoxide magnesium compound in individual equivalents of from about 0.5 to about 4.

DESCRIPTION

Embodiments of the inventions will now be described in greater detail below, including specific embodiments, versions and examples, but the inventions are not limited to these embodiments, versions or examples, which are included to enable a person having ordinary skill in the art to make and use the inventions when the information is combined with available information and technology.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.113 etc., and the endpoints 0 and 10. Also, a range associated with chemical substituent groups such as, for example, "$C_1$ to $C_5$ hydrocarbons," is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Further as used in the specification and the appended claims, the singular forms "a," "an," and "the" include their plural referents unless the context clearly dictates otherwise. For example, references to a "compound," an "agent," or a "reagent" are intended to include one or more compounds, or agents and reagents. References to a composition or process containing or including "an" ingredient or "a" step is intended to include other ingredients or other steps, respectfully, in addition to the one named, unless otherwise specified.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are combined and/or mixed prior to contact with another compound.

As used herein, "polymer density" is measured via ASTM-D-1238.

As used herein, "melt flow index" is measured via ASTM-D-1238-E.

As used herein, "melt index ratio" is measured via ASTM-D-1238-F.

The term "equivalent" refers to a molar ratio of a component to a starting material. For example, the starting material may be an alkyl magnesium compound, or magnesium metal, in some embodiments.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the environment and therefore such a recitation does not intend to bind the embodiments described herein to any predetermined temperature range. Furthermore, a temperature difference of a few degrees does not matter to the phenomenon under investigation, such as a preparation method.

As used herein, "substantially free" or "in the substantial absence of" means that the referred to components are present not as a result of intentional addition, but only, if present at all, as unintended impurities either neat or dissolved.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst component includes a metal component generally represented by the formula:

$$MR^4_x;$$

wherein M is a transition metal, $R^A$ is a halogen, an alkoxy or a hydrocarboxyl group, and x is the valence of the transition metal. For example, x may be from 1 to 4.

The transition metal may be selected from Groups IV through VIB (e.g., titanium, vanadium or chromium). $R^A$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst may be "activated" in some way before being useful for promoting polymerization. As discussed further below, in one embodiment, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst may further include one or more electron donors, such as internal electron donors and/or external electron donors. Internal electron donors may be used to reduce the atactic form of the resulting polymer, thus decreasing the amount of xylene solubles in the polymer for example. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated herein by reference.)

In one embodiment, external electron donors may be used to further control the amount of atactic polymer produced. Whatever the use, the external electron donors may include monofunctional or polyfunctional carboxylic acids, carboxylic anhydrides, carboxylic esters, ketones, ethers, alcohols, lactones, organophosphorus compounds and/or organosilicon compounds, for example. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst may or may not be associated with a support, either in combination with each other or separate from one another. The Z-N support materials may include a magnesium dihalide, such as magnesium dichloride or magnesium dibromide, silica, or polymeric beads for example.

Prior efforts to form the Ziegler-Natta catalyst generally included the methods involving multiple steps such as those described in U.S. Pat. No. 6,734,134 and U.S. Pat. No. 6,174,971, which are incorporated herein by reference.

A representative, non-limiting, illustration of a possible prior-art reaction scheme may be illustrated as follows:

$MgR^1R^2 + 2R^3OH \rightarrow Mg(OR^3)_2$  (1)

$Mg(OR^3)_2 + ClA(O_xR^4)_y \rightarrow \text{"solution A"}$  (2)

$\text{"A"} + TiCl_4/Ti(OR^5)_4 \rightarrow \text{"precipitate B"}$  (3)

$\text{"B"} + TiCl_4 \rightarrow \text{"C"}$  (4)

$\text{"C"} + TiCl_4 \rightarrow \text{"D"}$  (5)

$\text{"D"} + AlR^6_3 \rightarrow \text{activecatalyst}$  (6)

Embodiments of the present invention include eliminating f at least one of these steps, reducing the need for one or more reagents, avoiding expensive blended compounds, and/or substantially reducing solvent requirement.

Embodiments typically begin by preparing a magnesium dialkoxide compound. Methods generally include contacting an alkyl magnesium compound with an alcohol. In some embodiments, this reaction is conducted at a reaction temperature ranging from room temperature to about 90° C. for a time of up to about 10 hours, for example.

The alcohol may be contacted with the alkyl magnesium compound in an equivalent of from about 0.5 to about 6 or from about 1 to about 3, in some embodiments.

The alkyl magnesium compound may be represented by the following formula:

$MgR^1R^2$;

wherein $R^1$ and $R^2$ are independently selected from $C_1$ to $C_{10}$ alkyl groups. Non-limiting examples of alkyl magnesium compounds include butyl ethyl magnesium (BEM), diethyl magnesium, dipropyl magnesium and dibutyl magnesium.

The alcohol may be represented by the formula:

$R^3OH$;

wherein $R^3$ is selected from $C_2$ to $C_{20}$ alkyl groups. Non-limiting examples of alcohols generally include butanol, isobutanol and 2-ethylhexanol.

Further, many of the alkyl magnesium compounds utilized to form Ziegler-Natta catalysts, and in particular, butylethyl magnesium, are high cost materials. Therefore, one or more embodiments may include modifying and/or replacing the alkyl magnesium compound. For example, one specific embodiment includes utilizing a magnesium metal for the catalyst preparation in place of the alkyl magnesium compound.

In such an embodiment, the magnesium metal may contact the alcohol (e.g., to form the magnesium dialkoxide) at a temperature of from about room temperature to about 200° C., for example. In one embodiment, the magnesium metal contacts the alcohol at a plurality of temperatures, such as a first temperature of from about room temperature to about 120° C. and a second temperature of from about 100° C. to about 200° C., for example.

The magnesium metal may be added to the alcohol in an equivalent of from about 0.05 to about 10, or from about 0.05 to about 2, or from about 0.10 to about 0.90, or from about 2 to about 10, or from about 2 to about 5, for example. In one embodiment, an excess amount of the alcohol contacts the magnesium metal. In one embodiment, the resulting mixture (e.g., magnesium dialkoxide) is then washed in the presence of a modifier. The modifier may include an organoaluminum compound, such as triethyl aluminum or mixtures of butyl ethyl magnesium and triethyl aluminum, for example.

The magnesium dialkoxide compound is then contacted with a plurality of first agents to form reaction product, "A," which precipitates (i.e. as a solid). In one embodiment, the plurality of first agents includes at least three compounds. In another embodiment, the first agents consist essentially of three compounds or less that react with the magnesium dialkoxide. In one embodiment, two or more of these compounds are blended prior to contact with the magnesium dialkoxide. However, a less expensive embodiment may be to contact the compounds separately, two or more either sequentially or simultaneously with the magnesium dialkoxide.

One advantage of some embodiments is the ability to use significantly less solvent (such as hexane) than would otherwise be required if a blend of alkoxides was used and/or if multiple alkoxides or blends of $TiCl_4$ were used.

In an alternative embodiment, the first agents consist essentially of two compounds that are not blended but are added sequentially to the magnesium dialkoxide.

The magnesium dialkoxide and first agents may be contacted in the presence of an inert reagent. In some embodiments a hydrocarbon reagent is used. Suitable hydrocarbon reagents include substituted and unsubstituted aliphatic hydrocarbons, and substituted and unsubstituted aromatic hydrocarbons. For example, the reagent may include hexane, heptane, octane, decane, toluene, xylene, dichloromethane, chloroform, 1-chlorobutane or combinations thereof.

In some embodiments, the first agents and magnesium dialkoxide are contacted at a temperature of from about 0° C. to about 100° C. or from about 20° C. to about 90° C. for a time of from about 0.2 hours to about 24 hours or from about 1 hour to about 5 hours, at room temperature for example.

In one embodiment the first agents include at least a first, optionally second, and third active compound ("active" meaning reactive with the magnesium dialkoxide). In another embodiment, the first agents are essentially limited to a first, second, and third active compound.

Embodiments of the first, and if present, second compound may generally be represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R'' are independently selected from $C_1$-$C_{10}$ alkyls which may be linear, branched, aromatic or cyclic;

x is 0 or 1; and y+z is the valence of A. Non-limiting examples of first and second compounds include tetra-n-butyl titanate, tetra iso-propyl titanate, tetra ethyl titanate, and tetra-t-butyl titanate, titanium bis(ethyl acetoacetato)diisopropoxide, tetraphenyl titanate]pentamethylcyclopentadienyltitanium trimethoxide, titanium(IV) di-i-propoxidebis [BREW], titanium(IV) 2-ethylhexoxide, tris(2,2,6,6-tetramethyl-3-5-heptanedionato titanium(III), titanium methoxide, O-allyloxy(polyethyleneoxy)-triisopropoxytitanate, titanium allylacetoacetatetriisopropoxide, titanium bis(triethanolamine)-diisopropoxide, titanium di-n-butoxide (bis-2,4-pentanedionate), titanium diisoprpoxide(bis-2,4-pentanedionate, titanium diisopropoxidebis(tetramethylheptanedionate), tetra-i-butyl titanate, titanium lactate, titanium methacrylatetriisopropoxide, titanium methacryloxyethylacetoacetatetriisopropoxide, 2-methacryloxyethoxy)triisopropoxidetitante, titanium methoxypropoxide, titanium methylphenoxide, titanium n-nonyloxide, titanium oxide bis (pentanedionate), tetra-n-propyl titanate, titanium stearyloxide, titanium tertakis(bis 2,2-(allyloxymethyl)butoxide), titanium triisopropoxide tri-n-butylstannoxide, titanium triisostearoylisopropoxide, titanium trimethacrylate methoxyethoxyehoxide, titanium trimethylsiloxide, and titanocene diphenoxide.

In one embodiment, the third compound is an unblended metal halide, for example $TiCl_4$.

The equivalent amount of first agents may vary widely. In one embodiment, the first compound is contacted with the magnesium dialkoxide in an equivalent of from about 0.25 to about 2, or from about 0.5 to about 1. The second compound is contacted with the magnesium dialkoxide in an equivalent of from about 0.25 to about 3, or from about 1 to about 2, or from about 0.75 to about 1.5. The third compound is contacted with the magnesium dialkoxide in an equivalent of from about 0.5 to about 5, or from about 1 to about 4, or from about 2.25 to about 3.

The first, second and third compounds may be contacted with the magnesium dialkoxide sequentially in order with the third compound being contacted last. Optionally, the fist and second compounds may be blended or contacted simultaneously, however, the metal halide is contacted last in at least an amount sufficient to cause precipitation of product "A."

In embodiments where the first agent consist essentially of only two compounds, they are not blended.

Contacting the first agents, specifically the metal halide (e.g., $TiCl_4$) with the magnesium dialkoxide compound causes precipitation of reaction product "A." In one embodiment, the reaction product "A" solids are washed in one or more inert reagents, such as aromatic or aliphatic hydrocarbons (hexane, heptane, toluene etc.).

Reaction product "A" is then contacted with a second agent to form reaction product "B." In one embodiment, the second agent includes a metal halide. In one embodiment the metal halide includes $TiCl_4$. In another embodiment, the metal halide is $TiCl_4$ that is not blended with any other compound prior to contact with reaction product "A."

The amount of second agent may vary widely. In one embodiment, the second agent is added in an equivalent of from about 0.1 to about 5, or from about 0.5 to about 3, or from about 1 to about 2. The reaction may be conducted at room temperature, and from 30 minutes to 3, 2, or 1 hour, for example.

In one embodiment reaction product "B" is washed as described for reaction product "A."

In one embodiment, reaction product "B" is contacted with a metal halide such as titanium tetrachloride. The reaction may be conducted at room temperature, for example, and from 30 minutes 3, 2, or 1 hour. The amount of titanium tetrachloride may vary widely. In one embodiment, the titanium tetrachloride is added in an equivalent of from about 0.1 to about 5, or from about 0.5 to about 3, or from about 1 to about 2. In one embodiment the product is then washed as previously described.

In one embodiment, reaction product "B" is contacted with metal halide only once before catalyst formation, i.e., before contact with the third agent as described below. In another embodiment, reaction product "B" is contacted with metal halide at least two times before being contacted with the third agent.

Reaction product "B" is then contacted with a third agent to form a catalyst component. In one embodiment the third agent comprises an organoaluminum compound.

In one embodiment the third agent is added to reaction product "B" in an equivalent of from about 0.1 to about 2, or from 0.5 to about 1.2.

The organoaluminum compounds may include aluminum alkyls having the following formula:

$$AlR^6_3;$$

wherein $R^6$ is a $C_1$ to $C_{10}$ alkyl compound. Non-limiting examples of the aluminum alkyl compounds generally include trimethyl aluminum (TMA), triisobutyl aluminum (TIBAl), triethyl aluminum (TEAl), tr-n-octyl aluminum and tri-n-hexyl aluminum.

Note that while the primary reaction components are illustrated above, additional components may be reaction products or used in reactions and not illustrated above. Further, while described herein in terms of primary reaction steps, it is known to those skilled in the art that additional steps may be included in the reaction schemes and processes described herein (e.g., washing, filtering, drying, heating and/or decanting steps), while it is further contemplated that other steps may be eliminated or combined in certain embodiments In one embodiment, the catalyst is subjected to heat-treating. Such heat-treating generally includes heating the catalyst to a temperature in the range of from about 40° C. to about 150° C., or from about 90° C. to about 125° C. or from about 40° C. to about 60° C., for example. Such heat treatment may occur for a time of from about 0.5 hours to about 24 hours or from about 1 hour to about 4 hours, for example.

In another embodiment, the catalyst is pre-polymerized. Generally, a prepolymerization process includes contacting a small amount of monomer with the catalyst after the catalyst has been contacted with the co-catalyst. Exemplary pre-polymerization processes are described in U.S. Pat. Nos. 5,106,804; 5,153,158; and 5,594,071, hereby incorporated by reference.

Any one or more of the embodiments described above may independently be combined with one or more of the other, in any order unless otherwise specified.

Polymerization Processes

As indicated elsewhere herein, catalyst systems are used to form polyolefin compositions. Once the catalyst is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high-pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated herein by reference.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers include norbornene, norbornadiene, isobutylene, isoprene, vinylbenzocyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated herein by reference.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated herein by reference.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry, free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, stirred reactors in series, parallel or combinations thereof may be used, for example. Upon removal from the reactor, the polymer may be passed to a polymer recovery system for further processing, such as addition of additives and/or extrusion, for example.

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

In one embodiment, ethylene based polymers may have a density of from about 0.86 g/cc to about 0.978 g/cc, or from about 0.88 g/cc to about 0.965 g/cc, or from about 0.90 g/cc to about 0.96 g/cc or from about 0.91 g/cc to about 0.94 g/cc, for example.

Such ethylene-based polymers may have a molecular weight distribution of at least 4 or at least 5, for example.

The ethylene-based polymers may have a melt strength of from about 6.5 cN to about 11 cN, or from about 7 cN to about 11 cN or from about 7 cN to about 10 cN, for example.

The ethylene polymers may have a melt flow index (MFI) of from about 0.01 dg/min to about 1000 dg/min., or from about 0.01 dg/min. to about 100 dg/min., or from about 0.02 dg/min. to about 50 dg/min. or from about 0.03 dg/min. to about 0.1 dg/min, for example.

The ethylene-based polymers may have a melt index ratio $I_{21}$ of at least about 20, or at least about 30, at least about 40, at least about 50 or at least about 55, for example.

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

The invention having been generally described, the following examples are provided merely to illustrate certain embodiments of the invention, and to demonstrate the practice and advantages thereof. It is understood that the examples are given by way of illustration and are not intended to limit the scope of the specification or the claims in any manner.

EXAMPLES

As used herein, "BEM" refers to 20.2 wt. % solution of butylethylmagnesium (0.12 wt. % Al).

As used herein, "EHOH" refers to 2-ethylhexanol.

As used herein, "TNBT" refers to tetra n-butyl titanate.

As used herein, "Ti(OiPr)$_4$" refers to tetra iso-propyl titanate.

As used herein, "Ti(OEt)$_4$" refers to tetra ethyl titanate.

As used herein, "TTBT" refers to tetra t-butyl titanate.

As used herein, "Ti(OiPr)$_2$(EtAcac)$_2$" refers to titanium bis(ethyl acetoacetato)diisopropoxide.

As used herein, "TEAl" refers to triethyl aluminum.

As used herein "TIBAl" refers to triisobutyl aluminum.

Comparative Catalyst 1: The preparation of Comparative Catalyst 1 was achieved by slurrying 100 mmol (54.7 g) of BEM in hexane (total volume 100 ml) and stirring (250 rpm) the mixture at room temperature. In addition, 216 mmol (28.18 g) of EHOH was diluted in 50 mL of hexane and the resulting solution was added drop wise to the BEM solution at room temperature over 30 minutes. The reaction mixture was then stirred at room temperature for another hour.

The preparation then included adding 100 mmol (77.5 g) of ClTi(O$^i$Pr)$_3$ (1M in hexane) to the mixture at room temperature over 30 minutes. A clear, solid free solution was obtained. The reaction product was then stirred at room temperature for another hour.

In addition, 100 mmol (34.4 g) of TNBT and 150 mL of hexane were added to a 500 mL graduated cylinder. 200 mmol (37.04 g) of TiCl$_4$ was then added drop wise to the TNBT mixture at room temperature over 10 minutes to form 2TiCl$_4$/Ti(OBu)$_4$. Hexane was then added to the mixture to provide a mixture volume of 300 mL. The resulting mixture was then allowed to set over 2 hours.

The preparation then included adding the 2TiCl$_4$/Ti(OBu)$_4$ drop wise to obtain the solid the reaction product "A" at room temperature over 3 hours. This reaction product was then decanted and the resulting solids were washed three times with 200 mL of hexane and the solids were then suspended in 200 mL of hexane.

The preparation then included adding 100 mmol (19.0 g) of TiCl$_4$ (diluted to 50 mL in hexane) drop wise to the reaction product "A" at room temperature over 20 minutes to form reaction product "B". The reaction product "B" was then stirred at room temperature for another hour. The reaction "C" was then decanted and the solids were washed with 200 mL of hexane. The solids were then suspended in 200 mL of hexane.

The preparation then included adding 100 mmol (19.0 g) of TiCl$_4$; (diluted to 50 mL in hexane) drop wise to the reaction mixture "C" at room temperature over 20 minutes to form reaction mixture "D." The reaction mixture "D" was then stirred at room temperature for another hour. The reaction mixture "D" was then decanted and the solids were washed three times with 200 mL of hexane. The solids were then suspended in 150 ml of hexane.

The preparation then included adding 16 mmol (7.39 g) of TEAl (25 wt. %) to the reaction mixture "D" at room temperature over 25 minutes to form the active Comparative Catalyst 1. The active Comparative Catalyst 1 was then stirred at room temperature for another hour. The active Comparative Catalyst 1 was then decanted and dried, resulting in a yield of about 14 g.

Catalyst 2: The preparation of Catalyst 2 was achieved by slurrying 100 mmol (54.7 g) of BEM in hexane (total volume 100 ml) and stirring at room temperature at 250 rpm. In addition, 216 mmol (28.18 g) of EHOH was slurried in 50 mL of hexane and the resulting solution was added drop wise to the BEM solution at room temperature over 30 minute. The clear reaction mixture was then stirred at room temperature for one hour.

The preparation then included adding 50 mmol (17.02 g) of TNBT (diluted to 100 mL in hexane) to the mixture at room temperature over 1 minute. A clear, solid free solution was obtained. The preparation then included adding 75 mmol (20.68 g) of Ti(OiPr)$_4$ (diluted to 50 mL in hexane) at room temperature over 1 minute. The agitation rate was increased to 350 rpm.

The reaction product was then stirred for 1 hour. 225 mmol (42.7 g) of TiCl$_4$ (diluted to 250 mL with hexane) was then added to the reaction mixture at room temperature over 2 hours 50 minutes to form reaction product "A" and mixed at 350 rpm. The reaction product "A" was then stirred at room temperature at 350 rpm for another hour. The reaction mixture "A" was then decanted and the resulting white solids were washed three times with 200 mL of hexane. The solid catalyst was then suspended in 200 mL of hexane.

The preparation then included adding 100 mmol (19.0 g) of TiCl$_4$ (diluted to 50 mL in hexane) drop wise to the reaction product "A" at room temperature over 20 minutes to form reaction product "B". The reaction product "B" was then stirred at room temperature for another hour. The reaction product "B" was then decanted and the solid product "B" was washed with 200 mL of hexane three times. The catalyst 2 was then suspended in 200 mL of hexane.

Cataylst 3: The preparation of Cataylst 3 was achieved by adding 50 mmol (9.5 g) of TiCl$_4$ (diluted to 25 mL in hexane) drop wise to half of catalyst 2 slurry at room temperature over 20 minutes to form reaction product "C". The reaction mixture "C" was then stirred at room temperature for another hour. The reaction mixture "C" was then decanted and the solids were washed three times with 100 mL of hexane. cataylst 3 was then suspended in 100 ml of hexane.

Cataylst 4: The preparation of Cataylst 4 was achieved by adding 16 mmol (3.7 g) of TEAl (25 wt. %) (diluted to 25 mL) to cataylst 3 slurry" at room temperature over 25 minutes to form Cataylst 4. The Cataylst 4 composition was then stirred at room temperature for another hour. The solids were then suspended in 100 ml of hexane.

Cataylst 5: The preparation of Cataylst 5 was achieved by slurrying 100 mmol (54.7 g) of BEM in hexane (total volume 100 ml) and stirring at room temperature at 250 rpm. In addition, 216 mmol (28.18 g) of EHOH was diluted in 50 mL of hexane and the resulting solution was added drop wise to the BEM solution at room temperature over 30 minutes. The reaction mixture was then stirred at room temperature for another hour. The preparation then included adding 125 mmol (42.55 g) of TNBT (diluted to 130 mL in hexane) to the mixture at room temperature over 1 minute. A clear, solid free reaction product was obtained. The agitation rate was increased to 400 rpm.

The reaction product was then stirred for 1 hour. 225 mmol (42.7 g) of neat $TiCl_4$ was then added to the reaction mixture at room temperature over 3 hours 10 minutes to form reaction product "A". The reaction product "A" was then stirred at room temperature at 400 rpm for another hour. The reaction product "A" was then decanted and the resulting white solids were washed three times with 200 mL of hexane. The solids were then suspended in 200 mL of hexane.

The preparation then included adding 100 mmol (19.0 g) of $TiCl_4$ (diluted to 50 mL in hexane) drop wise to form reaction product "B" at room temperature over 20 minutes. The reaction product "B" was then stirred at room temperature for another hour. The reaction mixture "B" was then decanted and the solids were washed with 200 mL of hexane. The solids were then suspended in 200 mL of hexane.

The preparation then included adding 100 mmol (19.0 g) of $TiCl_4$ (diluted to 50 mL in hexane) drop wise at room temperature over 20 minutes to form reaction product "C". The reaction product "C" was then stirred at room temperature for another hour. The reaction product "C" was then decanted and the solids were washed three times with 200 mL of hexane. The solids were then suspended in 200 ml of hexane.

The preparation then included adding 16 mmol (7.39 g) of TEAl (25 wt. %) to the reaction product "C" at room temperature over 25 minutes to form Cataylst 5. The catalyst composition was then stirred at room temperature for another hour. The Cataylst 5 was then decanted and dried, resulting in a yield of about 18.5 g.

Cataylst 6: The preparation of Cataylst 6 was achieved by slurrying 100 mmol (54.7 g) of BEM in hexane (total volume 100 ml) and stirring at room temperature at 250 rpm. In addition, 216 mmol (20.68 g) of EHOH was slurried in 50 mL of hexane and the resulting solution was added drop wise to the BEM solution at room temperature over 30 minutes. The reaction mixture was then stirred at room temperature for another hour. The preparation then included adding 73 mmol (20.68 g) of $Ti(OiPr)_4$ (diluted to 50 ml in hexane) to the mixture at room temperature over minutes. A clear solid gel-like product was obtained to which 150 ml hexane was added along with agitation to dissolve the gel-like material. A reaction product "A" was obtained upon the addition of 225 mmol (42.7 g) of $TICl_4$ (diluted to 130 ml hexane.) This mixture was stirred for one hour, and was then decanted and the solids were washed with 200 mL of hexane. The solids were then suspended in 200 mL of hexane.

The preparation then included adding 100 mmol (19.0 g) of $TiCl_4$ (diluted to 50 mL in hexane) drop wise to the reaction product "B" at room temperature over 20 minutes. The reaction product "B" was then stirred at room temperature for another hour. The reaction product "B" was then decanted and the solids were washed three times with 200 mL of hexane. The solid was then suspended in 200 ml of hexane.

The preparation then included adding 16 mmol (7.39 g) of TEAl (25 wt. %) to the reaction product "B" at room temperature over 25 minutes to form active Cataylst 6. Cataylst 6 composition was then stirred at room temperature for another hour. Cataylst 6 composition was then decanted and re-slurried in 200 ml hexane Cataylst 7 The preparation of Cataylst 7 was achieved by slurrying 50 mmol (27.4 g) of BEM in hexane (total volume 50 ml) and stirring at room temperature at 250 rpm. In addition, 108.5 mmol (14.2 g) of EHOH was slurried in 25 mL of hexane and the resulting solution was added drop wise to the BEM solution at room temperature over 30 minutes. The reaction mixture was then stirred at room temperature for another hour.

The preparation then included adding 37.5 mmol (8.6 g) of $Ti(OEt)_4$ (diluted to 65 mL in hexane) to the mixture at room temperature over 1 minute. A clear, solid free reaction mixture was obtained. The agitation rate was increased to 400 rpm.

The reaction mixture was then stirred for 1 hour. 112.5 mmol (21.2 g) of $TiCl_4$ (diluted to 75 mL with hexane) was then added to the reaction mixture at room temperature over 2 hours 30 minutes to form the solid reaction product "A". This solid reaction product "A" was then stirred at room temperature at 400 rpm for another hour. The reaction product "A" was then decanted and the resulting white solids were washed three times with 200 mL of hexane. The solids were then suspended in 200 mL of hexane.

The preparation then included adding 50 mmol (9.5 g) of $TiCl_4$ (diluted to 25 mL in hexane) drop wise to form the product "B" at room temperature over 20 minutes. The reaction product "B" was then decanted and the solids were washed with 200 mL of hexane. The solids were then suspended in 200 mL of hexane.

The preparation then included adding 50 mmol (9.5 g) of $TiCl_4$ (diluted to 25 mL in hexane) drop wise to the product "B" at room temperature over 20 minutes to form reaction product "C". The reaction product "C" was then stirred at room temperature for another hour. The reaction product "C" was then decanted and the solids were washed three times with 200 mL of hexane. The solids were then suspended in 100 ml of hexane.

The preparation then included adding 8 mmol (3.7 g) of TEAl (25 wt. %) to the reaction product "C" at room temperature over 25 minutes to form Cataylst 7. Cataylst 7 was then stirred at room temperature for another hour. The catalyst composition was then decanted and dried, resulting in a yield of about 8.5 g.

Cataylst 8: The preparation of Cataylst 68 was achieved by slurrying 100 mmol (54.7 g) of BEM in hexane (total volume 100 ml) and stirring (250 rpm) the mixture at room temperature. In addition, 216 mmol (28.18 g) of EHOH was slurried in 50 mL of hexane and the resulting solution was added drop wise to the BEM solution at room temperature over 30 minutes. The reaction mixture was then stirred at room temperature for another hour.

The preparation then included adding 75 mmol (31.8 g) of $Ti(OiPr)_2(EtAcac)_2$ (diluted to 200 mL in hexane) to the mixture at room temperature over 1 minute. A clear orange, solid free reaction mixture was obtained. The agitation rate was increased to 400 rpm.

The reaction mixture was then stirred for 1 hour. 225 mmol (42.7 g) of $TiCl_4$ (diluted to 130 mL) was then added to the reaction mixture at room temperature over 3 hours to form solid reaction product "A". The reaction mixture "A" was then stirred at room temperature at 400 rpm for another hour. The reaction mixture "A" was then decanted and the resulting white solids were washed three times with 200 mL of hexane. The solids were then suspended in 200 mL of hexane.

The preparation then included adding 100 mmol (19.0 g) of TiCl$_4$ (diluted to 50 mL in hexane) drop wise at room temperature over 20 minutes to form the reaction product "B." This was then stirred at room temperature for another hour. The reaction product "B" was then decanted and the solids were washed with 200 mL of hexane. The solids were then suspended in 200 mL of hexane.

The preparation then included adding 100 mmol (19.0 g) of TiCl$_4$ (diluted to 50 mL in hexane) drop wise to the reaction mixture "B" at room temperature over 20 minutes to form reaction mixture "C". The reaction mixture "C" was then stirred at room temperature for another hour. The reaction mixture "C" was then decanted and the solids were washed three times with 200 mL of hexane. The solids were then suspended in 200 ml of hexane.

The preparation of Cataylst 8 then included adding 16 mmol (7.39 g) of TEAl (25 wt. %) to the reaction product "C" at room temperature over 25 minutes to form Catalyst 8 composition.

This composition was then stirred at room temperature for another hour, and then decanted and reslurried in 200 ml hexane.

Cataylst 9 The preparation of Cataylst 9 was achieved by slurrying 10 mmol (5.5 g) of BEM in hexane (total volume 15 ml) and stirring (250 rpm) the mixture at room temperature. In addition, 22 mmol (2.9 g) of EHOH was diluted in 10 mL of hexane and the resulting solution was added drop wise to the BEM solution at room temperature over 5 minutes. The reaction mixture was then stirred at room temperature for another hour.

The preparation then included adding 7.5 mmol (2.6 g) of TTBT (diluted to 50 mL in hexane) to the mixture at room temperature over 1 minute. The agitation rate was increased to 400 rpm.

The reaction mixture was then stirred for 1 hour. 22.8 mmol (4.3 g) of TiCl$_4$ (diluted to 15 mL) was then added at room temperature over 1 hour 20 minutes to form the solid reaction product "A." The reaction product "A" was then stirred at room temperature at 400 rpm for another hour. The reaction product "A" was then decanted and the resulting white solids were washed three times with 100 mL of hexane. The solids were then suspended in 20 mL of hexane.

The preparation then included adding 10 mmol (1.9 g) of TiCl$_4$ (diluted to 5 mL in hexane) drop wise over 1 minutes at room temperature to form reaction product "B". The reaction product "B" was then stirred at room temperature for another hour. The reaction product "B" was then decanted and the solids were washed with 100 mL of hexane. The solids were then suspended in 20 mL of hexane.

The preparation then included adding 10 mmol (1.9 g) of TiCl$_4$ (diluted to 5 mL in hexane) drop wise to the reaction product "B" at room temperature over 1 minutes to form reaction product "C". The reaction product "C" was then stirred at room temperature for another hour. The reaction product "C" was then decanted and the solids were washed three times with 100 mL of hexane. The solids were then suspended in 20 ml of hexane.

The preparation then included adding 1.6 mmol (0.74 g) of TEAl (25 wt. %) to the reaction product "C" at room temperature over 1 minute to form Cataylst 9 composition. Cataylst 9 composition was then stirred at room temperature for another hour. Catalyst composition was then decanted and re-slurried in 20 ml hexane.

The resulting catalysts except cataylst 3 were then exposed to polymerization at 80° C., 125 psig, 0.25 mmol/L TIBAl cocatalyst, 1 h with ethylene monomer to form polyethylene. Cataylst 3 was then exposed to polymerization at 80° C., 125 psig, 0.75 mmol/L TIBAl cocatalyst, 1 h with ethylene monomer to form polyethylene. The results of such polymerizations follow in Table 1.

TABLE 1

| Catalyst | 1 | 2 | 3 | 4 | 5 | 6 | 7 | 8 | 9 |
|---|---|---|---|---|---|---|---|---|---|
| Catalyst D50 (μ) | 7.3 | — | — | 6.4 | 5.1 | 6.2 | 4.5 | 5.0 | 6.5 |
| Polymer D50 (μ) | 236.1 | 194 | 206 | 216 | 165.2 | 90.3 | 60.9 | 178.6 | 97.8 |
| Fines (%) | 0.0 | 0 | 0 | 0 | 0.0 | 21.3 | 53.5 | 6.7 | 33.96 |
| Mg Activity (g/g/h) | 20,000 | 59,700 | 63,600 | 62,500 | 31,100 | 36,100 | 65,200 | 15,900 | 38,600 |
| Bulk Density (g/mL) | 0.38 | 0.26 | 0.24 | 0.28 | 0.37 | 0.42 | 0.29 | 0.29 | 0.33 |
| Ml2 (dg/min) | 0.62 | 0.49 | 0.64 | 0.61 | 0.44 | 0.33 | 0.43 | 0.38 | 0.36 |
| Ml5 (dg/min) | 1.84 | 1.55 | 2.18 | 1.89 | 1.68 | 0.95 | 1.31 | 1.27 | 1.16 |
| SR2 | 31.3 | 31.4 | 36.1 | 33.6 | 35.5 | 30 | 30.7 | 27.4 | 38.3 |
| SR5 | 10.5 | 9.9 | 10.6 | 10.8 | 9.3 | 10.4 | 10.1 | 8.2 | 11.9 |
| Resin Density (g/mL) | 0.9591 | 0.9583 | 0.9614 | 0.9606 | 0.9578 | 0.9572 | 0.9571 | 0.9564 | 0.9577 |
| Mn | 21068 | 24581 | 20948 | 22002 | 22994 | 30056 | 26669 | 29582 | 25182 |
| Mw | 163147 | 167207 | 138820 | 146055 | 163317 | 181174 | 161294 | 165528 | 179507 |
| Mz | 930370 | 1150907 | 926145 | 887138 | 909730 | 869601 | 811358 | 847120 | 1118729 |
| Mn/Mw | 7.7 | 6.8 | 6.6 | 6.6 | 7.1 | 6 | 6 | 5.6 | 7.1 |

While the foregoing is directed to embodiments of the present invention, other and further embodiments of the invention may be devised without departing from the basic scope thereof and the scope thereof is determined by the claims that follow.

What is claimed is:

1. A process of forming a catalyst comprising:
   contacting an alkyl magnesium compound with alcohol to form a magnesium dialkoxide compound;
   contacting the magnesium dialkoxide compound with a plurality of first agents to thereby form a solid reaction product "A", wherein the plurality of first agents comprises a first compound, a second compound, and a third compound; wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R" are independently selected from $C_1$-$C_{10}$ alkyls which may be linear, branched, aromatic or cyclic; x is 0 or 1; and y+z is the valence of A; wherein the first and second compounds are contacted with the magnesium dialkoxide in the substantial absence of metal halide; and wherein the third compound is contacted last and consists essentially of unblended $TiCl_4$;
   contacting reaction product "A" with a second agent to form reaction product "B", wherein the second agent comprises a metal halide; and
   contacting reaction product "B" with a third agent to form a catalyst, wherein the third agent comprises an organoaluminum compound.

2. The process of claim 1, wherein the alkyl magnesium compound is represented by the formula $MgR^1R^2$, wherein $R^1$ and $R^2$ are independently selected from $C_1$ to $C_{10}$ alkyls.

3. The process of claim 1, wherein the alkyl magnesium compound is selected from butyl ethyl magnesium, diethyl magnesium, dipropyl magnesium, dibutyl magnesium and combinations thereof.

4. The process of claim 1, wherein the alcohol contacts the alkyl magnesium compound in an equivalent of from about 0.5 to about 6.

5. The process of claim 1, wherein the alcohol is represented by the formula $R^3OH$, wherein $R^3$ is selected from $C_2$ to $C_{20}$ alkyls.

6. The process of claim 1, wherein the reaction product B is not further contacted with metal halide before being contacted with organoaluminum compound.

7. The process of claim 1, wherein R' and R" are independently selected from $C_2$-$C_8$ alkyls which may be linear, branched, aromatic or cyclic.

8. The process of claim 1, wherein the first and second compounds are blended before being contacted with the magnesium dialkoxide.

9. The process of claim 1, wherein A is titanium for both the first and second compounds.

10. The process of claim 1, wherein the plurality of firsts agents consists essentially of the first, second and third compounds.

11. The process of claim 1, wherein the plurality of first agents is added to the alkyl magnesium compound in an equivalent of from about 2 to about 4.

12. The process of claim 1, wherein the first compound comprises tetra n-butyl-titanate, and the second compound comprises titanium isopropoxide.

13. The process of claim 1, wherein the second compound comprises tetra n-butyl-titanate, and the first compound comprises titanium isopropoxide.

14. The process of claim 1, wherein for the first and/or second compound R' and R" are a $C_3$ alkyl.

15. A method of forming polyethylene comprising:
   providing a magnesium dialkoxide compound;
   contacting the magnesium dialkoxide compound with a plurality of unblended first agents to thereby form a solid reaction product, wherein the plurality of first agents comprises a first compound, a second compound, and a third compound; wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R" are independently selected from $C_1$-$C_{10}$ alkyls which may be linear, branched, aromatic or cyclic; x is 0 or 1; and y+Z is the valence of A; wherein the first and second compounds are contacted with the magnesium dialkoxide in the substantial absence of metal halide; and wherein the third compound is contacted last and consists essentially of unblended $TiCl_4$; to thereby form a solid reaction product
   contacting the reaction product with agents selected from halogenating agents/titanating agents, activating agents and combinations thereof to form a catalyst; and
   contacting the catalyst with ethylene monomer to form polyethylene.

16. A process of forming a catalyst precursor consisting essentially of:
   contacting, in a single reagent or mixture of reagents, a magnesium dialkoxide compound with a plurality of unblended compounds to thereby precipitate a solid catalyst precursor, wherein the first and second compounds are independently represented by the formula: $A(O_xR'X^1)_y(O_xR''X^2)_z$ wherein A is independently selected from titanium, silicon, aluminum, carbon, tin and germanium; $X^1$ and $X^2$ are optional and when one and/or the other are present, they are the same or different heteroatoms; R' and R" are independently selected from $C_1$-$C_{10}$ alkyls which may be linear, branched, aromatic or cyclic; x is 0 or 1; and y+z is the valence of A; wherein the first and second compounds are contacted with the magnesium dialkoxide in the substantial absence of metal halide; and wherein the third compound is contacted last and is $TiCl_4$.

17. The process of claim 16, wherein R" and R' are independently selected from $C_2$-$C_8$ which may be branched, linear, cyclic or aromatic.

18. The process of claim 16, wherein A is titanium for both the first and second compounds.

19. The process of claim 14, wherein both R' and R" are a $C_3$ alkyl.

20. The process of claim 17, wherein the first and/or second compound is tetra n-butyl titanate.

21. The process of claim 17, wherein the first and/or second compound is titanium isopropoxide.

22. The process of claim 17, wherein the reagent is selected from substituted and unsubstituted aromatic and aliphatic hydrocarbons and combinations thereof.

* * * * *